J. H. HOTCHKIN.
Potato Digger.
No. 92,450.
Patented July 13, 1869.
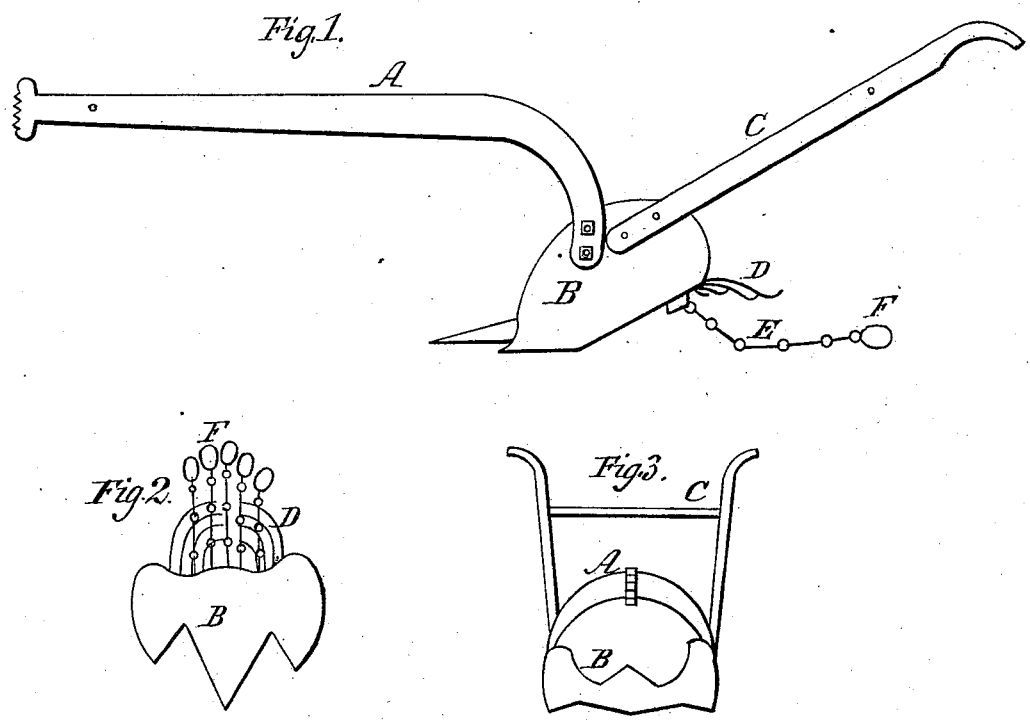
Witnesses.
Benjamin L. Hoyt.
Charles Ketchum.
Inventor.
James H. Hotchkin.

United States Patent Office.

JAMES H. HOTCHKIN, OF PRATTSBURG, NEW YORK.

Letters Patent No. 92,450, dated July 13, 1869.

IMPROVEMENT IN POTATO-DIGGER.

The Schedule referred to in these Letters Patent and making part of the same.

To all whom it may concern:

Be it known that I, JAMES H. HOTCHKIN, of Prattsburg, in the county of Steuben, and State of New York, have invented a new and useful Improvement in Potato-Diggers; and I do hereby declare that the following is a full, clear, and exact description of the construction and operation of the same, reference being had to the annexed drawings, making a part of this specification, in which—

Figure 1 is a side view;
Figure 2, a top view; and
Figure 3, a forward view.

The letters of reference refer to the same parts in each figure.

The nature of my invention consists in making a potato-digger that may be drawn by one or two horses, and be held by the driver.

It is made and shaped so that it moves the dirt and potatoes in various directions, thereby causing the potatoes to be raised to the surface, then delivering the dirt and potatoes on stationary bent rods, that conduct the potatoes to the middle, or in a row; also having chains for the final separation, so that the potatoes will be brought to the surface and left in a compact row.

To enable others skilled in the art to make and use my invention, I will proceed to describe its mode of construction and operation.

A is the beam. It is made of iron, or may be made part wood and part iron. The rear end is branched, so that it may be securely fastened to the digger, as shown in fig. 1.

B is the digger. It may be made of sheet or cast-metal. The centre portion must extend further forward than the other parts, so that it will enter the soil better. The middle is raised at an angle, as shown in figs. 1 and 3, for the purpose of moving to the right and left.

The sides or mould-boards are provided with a cutting-edge, as shown in fig. 2. The rear ends of these are nearer together than the forward parts, for the purpose of bringing the dirt together, so that it will all fall upon the bent rods D.

C are the handles, of ordinary construction. They may be securely fastened to the mould-boards.

D is one of a series of bent rods. They are of iron, and securely fastened to the rear part of the digger, and they are bent downward and inward, as shown in figs. 1 and 3. Upon these the dirt and potatoes fall after leaving the digger, so that they do much toward separating them, and causing them to fall into a line in the centre of the row, and upon the separating-chains.

E is one of a series of separating-chains. They are made of rods of iron, cut in short pieces, with their ends bent to form a link. Any number of these chains may be applied, and they may be made of various lengths, so that the balls at their ends will not cause them to be kept too far apart. The forward ends are fastened to the rear end, and underneath the digger.

F is one of a series of wooden balls. They are each attached to the rear end of a chain. Their use is to keep the rear end of the chains upon the surface of the soil, so that the chains will raise the potatoes to the surface, and separate them from the soil.

Having thus fully described my invention,
What I claim as new, and desire to secure by Letters Patent, is—

The construction and arrangement of the digger B, rods D, chains E, and balls F, when used in combination, as and for the purpose set forth.

JAMES H. HOTCHKIN.

Witnesses:
BENJAMIN L. HOYT,
CHARLES KETCHUM.